United States Patent

Harrick (10) Patent No.: US 9,709,689 B2
(45) Date of Patent: Jul. 18, 2017

(54) GEOPHYSICAL CABLE PREPARATION FOR ANTIFOULING PAINT

(71) Applicant: PGS Geophysical AS, Oslo (NO)

(72) Inventor: Bruce William Harrick, Cypress, TX (US)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 14/506,013

(22) Filed: Oct. 3, 2014

(65) Prior Publication Data

US 2015/0226869 A1    Aug. 13, 2015

Related U.S. Application Data (60) Provisional application No. 61/937,267, filed on Feb. 7, 2014.

(51) Int. Cl.
    *B05D 3/10* (2006.01)
    *G01V 1/38* (2006.01)
    *G01V 13/00* (2006.01)

(52) U.S. Cl.
    CPC .............. *G01V 1/3843* (2013.01); *B05D 3/10* (2013.01); *B05D 3/108* (2013.01); *G01V 1/38* (2013.01); *G01V 13/00* (2013.01)

(58) Field of Classification Search
    CPC ........ B05D 3/0406; B08D 9/023; G01V 1/38; G01V 1/3843; G01V 13/00
    See application file for complete search history.

(56) References Cited

U.S. PATENT DOCUMENTS

| | | | |
|---|---|---|---|
| 7,145,833 B1 * | 12/2006 | Hoogeveen | B08B 9/023 134/6 |
| 7,409,919 B2 * | 8/2008 | Hoogeveen | B08B 9/023 114/312 |
| 7,649,803 B2 * | 1/2010 | Ray | 367/15 |
| 7,693,005 B2 | 4/2010 | Stenzel et al. | |
| 7,835,222 B2 * | 11/2010 | Lobe | G01V 1/201 367/15 |

(Continued)

FOREIGN PATENT DOCUMENTS

| EP | 2348078 | 7/2011 |
| GB | 2444604 | 6/2008 |

(Continued)

OTHER PUBLICATIONS

Trac Ecological Marine Products, Barnacle Buster Material Safety Data Sheet, pp. 1-2, Sep. 29, 2004.

(Continued)

*Primary Examiner* — Benjamin Fiorello (57) ABSTRACT

Embodiments relate generally to marine geophysical surveying. More particularly, embodiments relate to a streamer-preparation apparatus that cleans a geophysical cable to prepare it for application of an antifouling paint. An embodiment discloses a method comprising: moving a streamer into position for cleaning; directing a cleaning fluid onto the streamer as the streamer is being moved; and directing a gaseous fluid onto the streamer as the streamer is being moved. An embodiment discloses: applying an antifouling paint to the streamer with the streamer-preparation apparatus; and applying a curing agent to the streamer with the streamer-preparation apparatus.

22 Claims, 8 Drawing Sheets

(56) References Cited

U.S. PATENT DOCUMENTS

| | | | | |
|---|---|---|---|---|
| 8,007,595 B2* | 8/2011 | Hall | ............... | B08B 9/023 134/15 |
| 8,514,664 B2 | 8/2013 | Harrick et al. | | |
| 8,644,109 B2 | 2/2014 | Vignaux | | |
| 8,875,722 B2* | 11/2014 | Karlsen | ............ | G01V 1/3808 134/141 |
| 8,960,117 B2* | 2/2015 | Nielsen | ............ | B08B 1/008 114/244 |
| 9,254,509 B2* | 2/2016 | Wu | ............ | B08B 1/008 |
| 9,321,513 B2* | 4/2016 | MacQuin | ............ | B63C 11/52 |
| 9,375,763 B2* | 6/2016 | Macquin | ............ | G01V 13/00 |
| 9,423,527 B2* | 8/2016 | Macquin | ............ | G01V 13/00 |
| 2005/0052951 A1* | 3/2005 | Ray | ............ | G01V 1/247 367/188 |
| 2006/0029808 A1 | 2/2006 | Zhai et al. | | |
| 2006/0054186 A1* | 3/2006 | Lepage | ............ | B08B 1/008 134/6 |
| 2006/0111022 A1* | 5/2006 | Sela | ............ | B08B 3/024 451/38 |
| 2010/0020644 A1 | 1/2010 | Vignaux | | |
| 2010/0278011 A1 | 11/2010 | Harrick | | |
| 2010/0294314 A1* | 11/2010 | Daleside | ............ | B08B 9/023 134/21 |
| 2011/0174207 A1 | 7/2011 | Harrick et al. | | |
| 2012/0176860 A1 | 7/2012 | Stenzel et al. | | |
| 2012/0321809 A1 | 12/2012 | Hartshorne et al. | | |
| 2013/0039153 A1 | 2/2013 | Hartshorne et al. | | |
| 2013/0098394 A1* | 4/2013 | Fleischer-Pedersen | . | B08B 9/023 134/6 |
| 2013/0142013 A1 | 6/2013 | Hartshorne et al. | | |
| 2013/0152979 A1 | 6/2013 | Mueller et al. | | |
| 2013/0170322 A1 | 7/2013 | Hartshorne et al. | | |
| 2014/0092234 A1* | 4/2014 | Thomas | ............ | B08B 1/008 348/84 |
| 2014/0141263 A1 | 5/2014 | Jones et al. | | |
| 2014/0247690 A1* | 9/2014 | MacQuin | ............ | G01V 1/3843 367/15 |

FOREIGN PATENT DOCUMENTS

| | | |
|---|---|---|
| GB | 2492316 | 1/2013 |
| WO | 2015088352 | 6/2015 |

OTHER PUBLICATIONS

Trac Ecological Marine Products, Barnacle Buster Marine Growth Remover, available at http://trac-online.com/pdf/TDS-Barnacle_Buster.pdf, printed from the Internet on Sep. 8, 2014.

European Search Report for Application No. 15153566.3 dated Feb. 27, 2017.

* cited by examiner

GEOPHYSICAL CABLE PREPARATION FOR ANTIFOULING PAINT

CROSS-REFERENCE TO RELATED APPLICATIONS

The present application claims priority to U.S. Provisional Application No. 61/937,267, filed on Feb. 7, 2014, the entire disclosure of which is incorporated herein by reference.

BACKGROUND

Embodiments relate generally to marine geophysical surveying. More particularly, embodiments relate to a streamer-preparation apparatus that prepares a streamer for application of an antifouling paint.

Techniques for marine geophysical surveying include seismic surveying and electromagnetic surveying, in which geophysical data may be collected from below the Earth's surface. Geophysical surveying has applications in mineral and energy exploration and production to help identify locations of hydrocarbon-bearing formations. Certain types of marine geophysical surveying, such as seismic or electromagnetic surveying, may include towing an energy source at a selected depth—typically above the seafloor—in a body of water. One or more streamers also may be towed in the water at selected depths—typically above the seafloor—by the same or a different vessel. The streamers are typically cables that include a plurality of sensors disposed thereon at spaced apart locations along the length of the cable. Some geophysical surveys locate sensors on ocean bottom cables or nodes in addition to, or instead of streamers. The energy sources may be configured to generate a signal that is related to a parameter being measured by the sensor. At selected times, the energy source may be actuated to generate, for example, seismic or electromagnetic energy that travels downwardly into the subsurface rock. Energy that interacts with interfaces, generally at the boundaries between layers of rock formations, may be returned toward the surface and detected by the sensors on the streamers. The detected energy may be used to infer certain properties of the subsurface rock, such as structure, mineral composition and fluid content, thereby providing information useful in the recovery of hydrocarbons.

Unfortunately, marine organisms may adhere to and then grow on nearly everything that is placed in water for extended periods of time, including marine geophysical sensor cables, such as towed streamers or ocean-bottom cables. For convenience, any such marine geophysical sensor cable will be referred to herein as a "streamer". Marine growth (also known as biofouling) often refers to barnacle growth but is intended to also include the growth of mussels, oysters, algae, bacteria, tubeworms, slime, and other marine organisms. This marine growth is particularly problematic with streamers as the marine growth can increase drag resistance of the streamer, leading to increased fuel costs and/or reduced production speed. An additional problem with marine growth includes reduced data quality due to increased noise.

To address marine growth, antifouling paints may be applied to the streamer. These antifouling paints may include biocides, heavy-metal compounds, or other materials that can inhibit marine growth. To reliably paint the surface of the streamer, it may be advantageous to have a clean, dry surface. However, previously used streamers may have a layer of dried salt, marine growth, or other contaminants/residues that may prevent good adhesion of the antifouling paint to the streamer.

BRIEF DESCRIPTION OF THE DRAWINGS

These drawings illustrate certain aspects of some of the embodiments of the present invention and should not be used to limit or define the invention.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed herein, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

Figure 1:
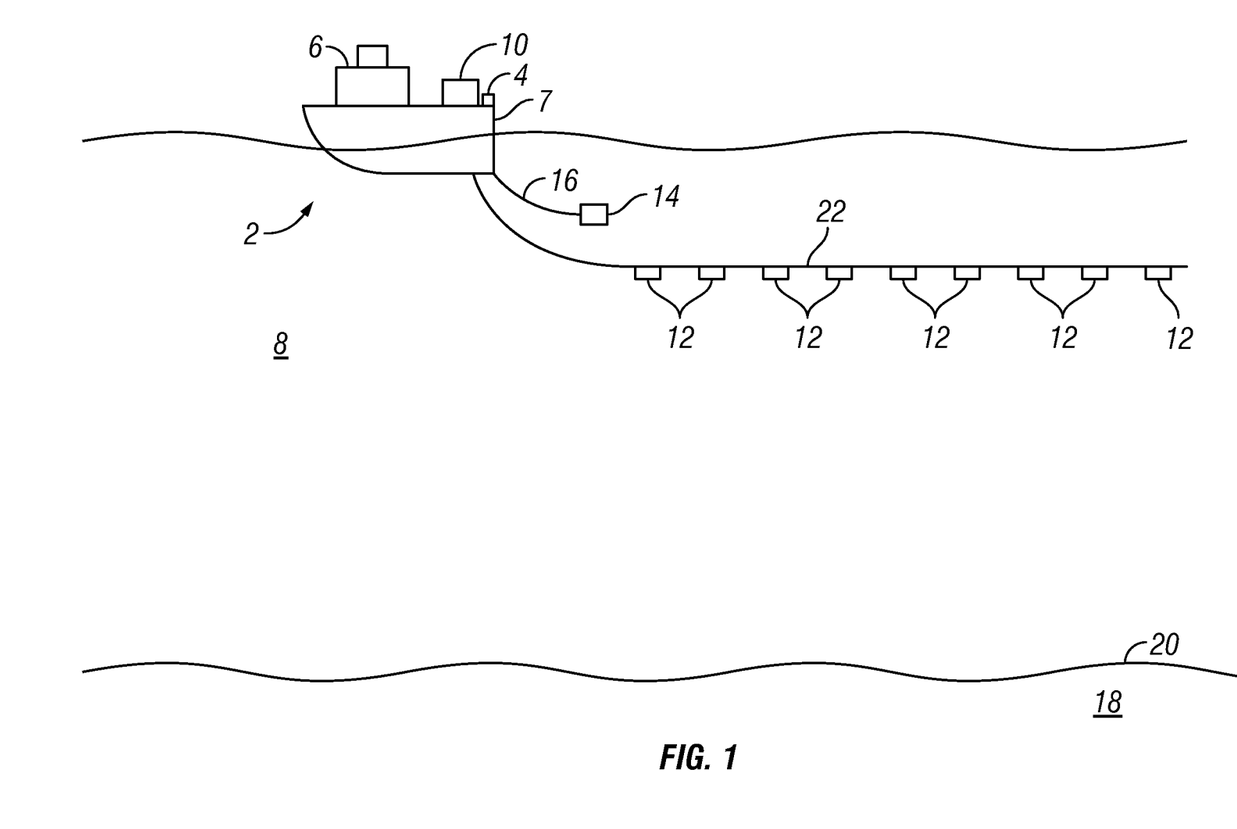
FIG. 1 illustrates an embodiment of a marine seismic survey that employs a streamer-preparation apparatus on the survey vessel.

Referring now to FIG. 1, a marine geophysical survey system 2 that employs a streamer-preparation apparatus 4 is illustrated in accordance with embodiments of the invention. As will be discussed in more detail below, in some embodiments, the streamer-preparation apparatus 4 may be used to prepare streamer 22 for application of an antifouling paint. Advantageously, embodiments of the invention may use the streamer-preparation apparatus 4 to remove saltwater, other residues or contaminants, and/or marine growth from the streamer 22 that would otherwise interfere with effective application of an antifouling paint.

In the illustrated embodiment, the marine geophysical survey system 2 may include a survey vessel 6 on which the streamer-preparation apparatus 4 may be deployed. The survey vessel 6 may move along the surface of a body of water 8, such as a lake or ocean. The survey vessel 6 may include thereon equipment, shown generally at 10 and collectively referred to herein as a "recording system." The recording system 10 may include devices (none shown separately) for detecting and making a time indexed record of signals generated by each of geophysical sensors 12 (explained further below) and for actuating an energy source 14 at selected times. The recording system 10 may also include devices (none shown separately) for determining the geodetic position of the survey vessel 6 and the various geophysical sensors 12.

In some embodiments, the survey vessel 6 (or a different vessel) may tow the energy source 14 in the body of water 8. A source cable 16 may couple the energy source 14 to the survey vessel 6. The energy source 14 may be towed in the body of water 8 at a depth ranging from 0 meters to about 300 meters, for example. While only a single energy source 14 is shown in FIG. 1, it is contemplated that embodiments may include more than one energy source 14. The energy source 14 may be any selectively actuatable source suitable for subsurface geophysical surveying, including without limitation seismic air guns, water guns, vibrators or arrays of such devices, or one or more electromagnetic field transmitters.

In some embodiments, the survey vessel 6 or another vessel may tow one or more streamers 22 on which the geophysical sensors 12 may be disposed. As illustrated, the energy source 14 and streamer 22 may be towed above the water bottom 20. The streamer 22 may include a towed marine seismic streamer, a towed marine electromagnetic streamer, or a combination thereof. While not shown, some marine seismic surveys locate geophysical sensors 12 on ocean bottom cables or nodes in addition to, or instead of, a streamer 22. As illustrated, the geophysical sensors 12 may be disposed at spaced apart locations on the streamer 22. The geophysical sensors 12 may be, without limitation, seismic sensors such as geophones, hydrophones, or accelerometers, or electromagnetic field sensors, such as electrodes or magnetometers. The geophysical sensors 12 may generate response signals, such as electrical or optical signals, in response to detecting energy emitted from the energy source 14 after the energy has interacted with rock formations 18 below the water bottom 20. In some embodiments, more than one streamer 22 may be towed by the survey vessel 6 or another vessel, and the streamers 22 may be spaced apart laterally, vertically, or both laterally and vertically. The detected energy may be used to infer certain properties of the subsurface rock, such as structure, mineral composition, and fluid content, thereby providing information useful in the recovery of hydrocarbons.

In accordance with an embodiment of the invention, a geophysical data product may be produced. The geophysical data product may include geophysical data and may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis, including further data processing, may be performed on the geophysical data product.

In some embodiments, the streamer-preparation apparatus 4 may be located on the survey vessel 6. As illustrated, the streamer-preparation apparatus 4 may be located at or near the stern 7 of the survey vessel 6 so that the streamer-preparation apparatus 4 may be proximate the streamer 22 during its recovery from, and/or deployment into, the body of water 8. In particular embodiments, the streamer 22 may be moved into position for preparation. Moving the streamer 22 into position may include, for example, recovering the streamer 22 from and/or deploying the streamer 22 into the body of water 8. The streamer may be prepared, for example, as it is being moved into position. The streamer 22 may be prepared to provide a clean, dry surface on the streamer 22 to improve adhesion of antifouling paint. The antifouling paint may be applied to the streamer 22 upon its deployment into the body of water 8 to mitigate marine growth on the streamer 22. Preparing the streamer 22 may be particularly beneficial for re-use of the streamer 22 as seawater and marine growth on the streamer 22 from a prior use may interfere with the application (or re-application) of the antifouling paint.

Examples of suitable antifouling paints include foul-release coatings, biocides and heavy-metal compounds. Suitable foul-release coatings may include coatings that are non-biocidal, generally hydrophobic or hydrophilic, and provide a surface that to which organisms cannot easily adhere. Specific examples of foul-release coatings may include elastomers, such as silicone rubbers, that can resist fouling by aquatic organisms. In some embodiments, the foul-release coatings may include superhydrophobic coatings which generally form a nano-particle layer that repels water. Superhydrophobic coatings may be formed from a variety of materials, including silicone-based coatings. Biocides that may be suitable generally may include coatings that contain substances toxic to aquatic life. In one particular embodiment, an antifouling paint may comprise a biocide that comprises copper or an alloy, oxide, or salt containing copper, referred to herein as a "copper biocide." Suitable alloys may include, for example, copper in an amount of about 40% or more. Examples of suitable copper alloys, oxides, and salts include, but are not limited to, brass, copper oxide, copper thicocynate, copper bronze, copper napthenate, copper resinate, copper nickel, and copper sulfide. In particular embodiments, an antifouling paint may comprise the copper biocide suspended in a suspension medium. The suspending medium may be selected so that it reacts with the outer surface or jacket of the streamer 22 such that it adheres thereto. The outer surface or jacket of the streamer 22 may be a polyurethane jacket. An example of a suitable suspending medium may comprise dissolved polyurethane. The antifouling paint may further comprise a solvent, such as N-methyl-pyrrolidone. To shorten the curing time of the antifouling paint, a curing agent may also be applied to the streamer 22. In some embodiments, the curing medium may comprise water. Application of the water to polyurethane surface treated with the antifouling paint (e.g., mixture of a suspending medium and biocide) in the form of a stream or mist may cause the suspension medium to cure and form a well-bonded film on the streamer 22 that contains the biocide. Additional details on suitable biocides and application techniques are described in more detail in U.S. Patent Publication No. 2012/0176860, the entire disclosure of which is incorporated herein by reference.

Figure 2A:
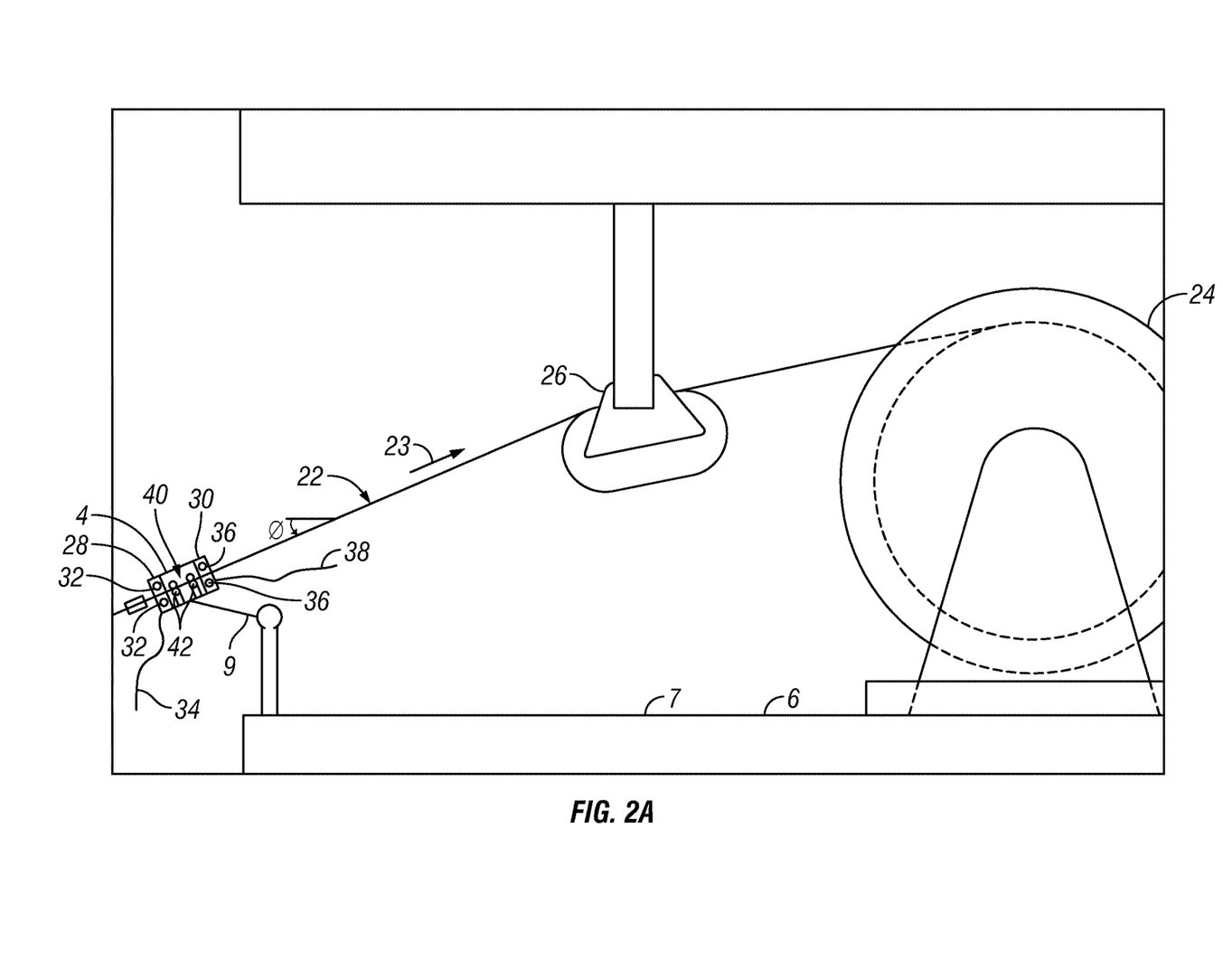
FIG. 2A illustrates an embodiment that employs a streamer-preparation apparatus on streamer recovery.
Figure 2B:
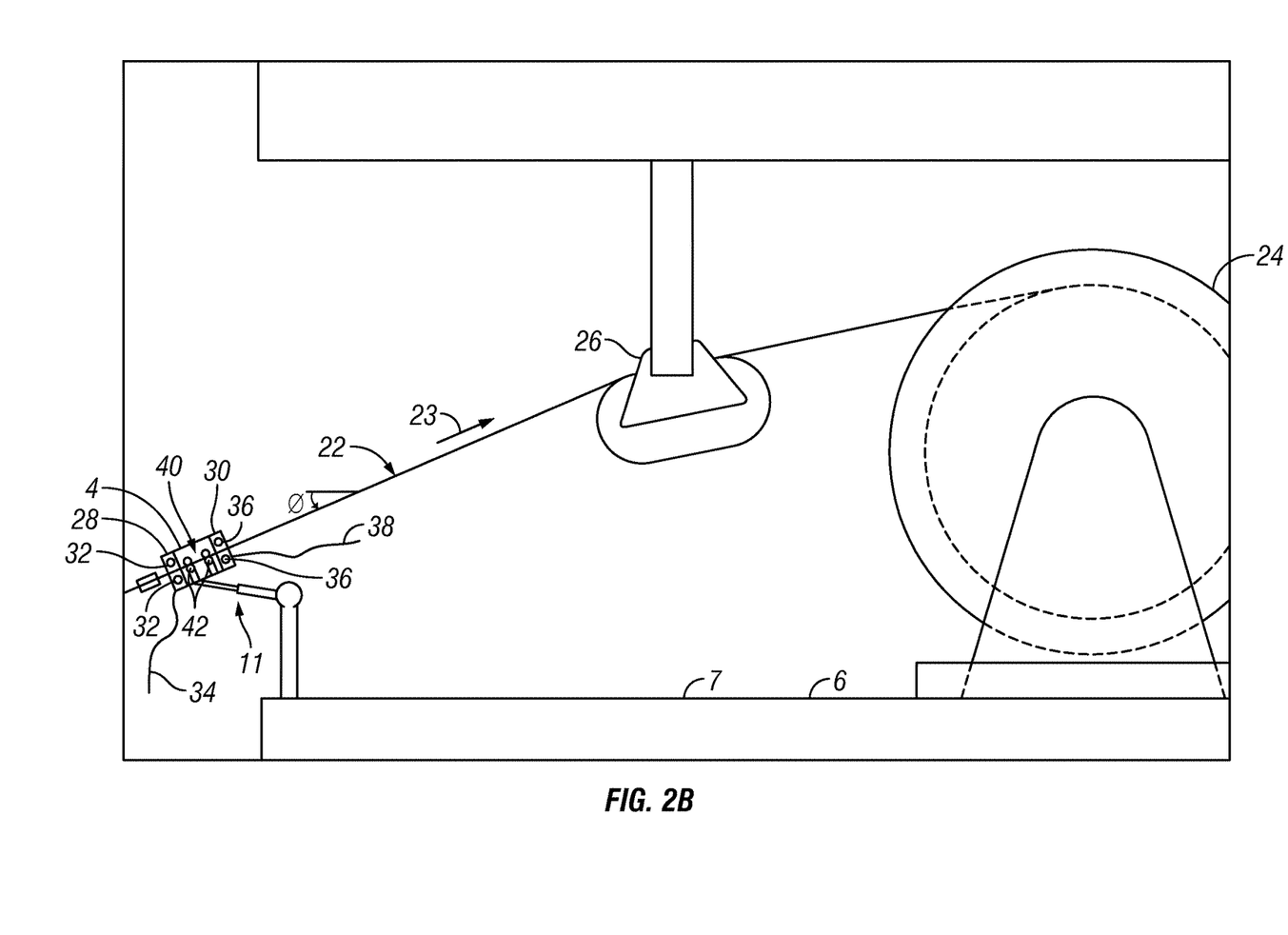
FIG. 2B illustrates another embodiment that employs a streamer-preparation apparatus on streamer recovery.

Referring now to FIG. 2A, an embodiment is illustrated that employs the streamer-preparation apparatus 4 on recovery of the streamer 22. As illustrated, the streamer 22 may be retrieved onto the stern 7 of the survey vessel 6 and stored on drum 24, for example. The streamer 22 may be retrieved in the direction indicated by arrow 23. In some embodiments, a spooling block 26 (e.g., a Neilsen block) or other suitable device may be used to aid in distribution of the streamer 22 on the drum 24. In the illustrated embodiment, the streamer-preparation apparatus 4 may be disposed on the stern 7 of the survey vessel 6 to prepare the streamer 22 as it is being retrieved. The streamer 22 may pass through the streamer-preparation apparatus 4 prior to storage on the drum 24. Tethering member 9 may secure the streamer-preparation apparatus 4 to the stern 7 of the survey vessel 6. While not shown, the tethering member 9 may also include a supply hose bundle for supplying air and/or water to the streamer-preparation apparatus 4. In alternative embodiments, the streamer-preparation apparatus 4 may be secured to the spooling block 26. In embodiments where the streamer-preparation apparatus 4 may be on or over the stern 7 of the survey vessel 6, the streamer-preparation apparatus 4 may be stabilized by the tethering member 9 may be in the form of a telescopic arm, for example, which can be anchored to a fixed point on the survey vessel 6 or the spooling block 26. FIG. 2B illustrates, a telescopic arm 11 securing the streamer-preparation apparatus over the stern 7 of the survey vessel. In addition to providing stability, the telescopic arm may enable recovery of the streamer-preparation apparatus 4 to a working area on the survey vessel 6 for maintenance.

In some embodiments, the streamer-preparation apparatus 4 may direct a cleaning fluid (in liquid, gas, or liquid-gas combination state) onto the surface of the streamer 22 to remove seawater and/or marine growth, or any other residue, from the streamer 22. The cleaning fluid may wash seawater from the streamer 22 so that it does not dry and form a residue (e.g., salt) on the streamer 22. The cleaning fluid may also loosen and remove marine growth from the streamer 22. After application of the cleaning fluid, in some embodiments, the streamer-preparation apparatus 4 may also direct a gaseous fluid onto the surface of the streamer 22 such that the surface of the streamer 22 may be dried. The gaseous fluid may blow off the mixture of the deposits (e.g., seawater, marine growth, etc.) and the cleaning fluid and dry the streamer 22.

Examples of suitable cleaning fluids include air and water. In some embodiments, additives (for example, bleach, hydrogen peroxide, vinegar, hydrochloric acid, sand, glass pellets, plastic pellets, etc.) may be added to the cleaning fluid to enhance the cleaning properties. In some embodiments, the air may be compressed air, for example, at a pressure up to about 80 pounds per square inch or even higher. As will be appreciated, air may not always be sufficient to remove all marine growth, such as algae and barnacles. Accordingly, water may be used in place of, or in addition to, the air. The water may be fresh water or seawater, for example. In some embodiments, the water may be heated. In alternative embodiments, a steam spray may be used for cleaning the streamer 22. Separate applications of fresh water and seawater may also be used. In particular embodiments, seawater may be used to clean the streamer 22 due its ready availability on the survey vessel 6, for example, when large volumes of water are required, as sufficient volumes of freshwater may not be available. In embodiments where the cleaning fluid is water, such as seawater, it may be especially advantageous to use a gaseous fluid to blow off the cleaning fluid from the streamer 22. In some embodiments, the gaseous fluid may be air or carbon dioxide. In some embodiments, additives (for example, alcohol) may be added to the gaseous fluid to enhance the drying properties. In some embodiments, the streamer 22 may also be further prepared by physical removal of the marine growth, for example, with scrapers or brushes. In some embodiments, air may be used as the cleaning fluid and as the gaseous fluid. In some embodiments, water such as seawater may be used as the cleaning fluid and air may be used as the gaseous fluid. The air used as the gaseous fluid may be compressed air, for example, at a pressure up to about 80 pounds per square inch or even higher.

As illustrated, the streamer-preparation apparatus 4 may comprise a cleaning-fluid nozzle unit 28 and a gaseous-fluid nozzle unit 30. The cleaning-fluid nozzle unit 28 may be positioned in the front side of the streamer-preparation apparatus 4 with respect to passage of the streamer 22 there through. Accordingly, the streamer 22 may be cleaned prior to application of the gaseous fluid for drying. The cleaning-fluid nozzle unit 28 may comprise nozzles 32 for directing the cleaning fluid onto the streamer 22. In a particular embodiment, the nozzles 32 may be air amplifiers, which may be vortex-type air amplifiers. Air amplifiers may be used, for example, in embodiments that use air as the cleaning fluid, to maximize air flow at lower pressures, due to safety consideration with supplying high-pressure air on the survey vessel 6. While FIG. 2A illustrates the cleaning-fluid nozzle unit 28 comprising two nozzles 32, embodiments may include more or less than two nozzles 32. By way of example, embodiments of the cleaning-fluid nozzle unit 28 may comprise five or more nozzles 32. As illustrated, the cleaning-fluid nozzle unit 28 may be supplied with the cleaning fluid via fluid supply line 34.

In some embodiments, the nozzles 32 may be positioned to direct the cleaning fluid at the streamer 22. For example, the nozzles 32 may be positioned to direct the cleaning fluid at an angle θ to obtain the desired impact. The angle θ may be from 0° to 90°. In some embodiments, the angle θ may be from about 10° to as close to about 30° and, about 20°, in particular embodiments. In some embodiments, the nozzles 32 may be arranged around the streamer 22 in a ring-shaped configuration, or any suitable configuration that provides a selected distribution of cleaning fluid, and spaced to direct the cleaning fluid onto the streamer 22 with minimal overlap.

Figure 6A:
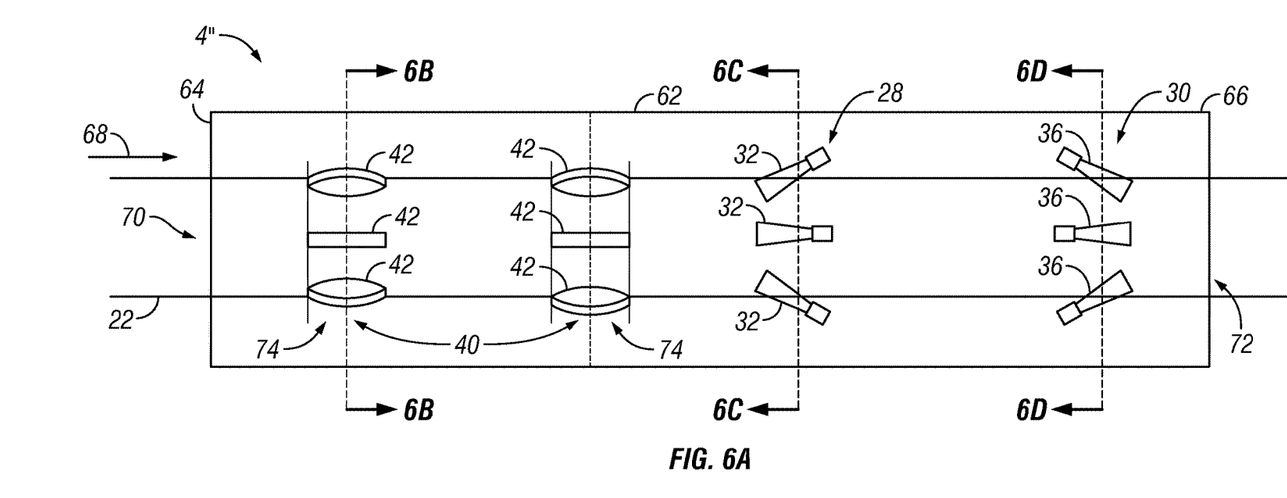
FIG. 6A illustrates an embodiment of a streamer-preparation apparatus.

The gaseous-fluid nozzle unit 30 may be positioned behind the cleaning-fluid nozzle unit 28 with respect to passage of the streamer 22 there through. The gaseous-fluid nozzle unit 30 may dry the streamer 22 by directing a gaseous fluid, such as air, onto the streamer 22. In some embodiments, the gaseous fluid may blow off the cleaning fluid from the streamer 22 so that the cleaning fluid does not dry on the streamer 22, preventing the buildup of salt on the streamer 22 in the case of seawater as the cleaning fluid, for example. In the illustrated embodiment, the gaseous-fluid nozzle unit 30 is positioned at the opposite end of the streamer-preparation unit 6 from the cleaning-fluid nozzle unit 28. However, it is not necessary that the cleaning-fluid nozzle unit 28 and the gaseous-fluid nozzle unit 30 be positioned on opposite ends of the streamer-preparation unit 6, and they can be positioned adjacent to one another in some embodiments, as shown in FIG. 6A. The gaseous-fluid nozzle unit 30 may comprise nozzles 36 for directing the gaseous fluid onto the streamer 22. In a particular embodiment, the nozzles 36 may be air amplifiers, which may be vortex-type air amplifiers. While FIG. 2A illustrates the gaseous-fluid nozzle unit 30 comprising two nozzles 36, embodiments may include more or less than two nozzles 36.

By way of example, embodiments of the gaseous-fluid nozzle unit 30 may comprise five or more nozzles 36. As illustrated, the gaseous-fluid nozzle unit 30 may be supplied with the gaseous fluid via gas supply line 38.

In some embodiments, the streamer-preparation apparatus 4 may further comprise a device, such as roller assembly 40, for holding the streamer-preparation apparatus 4 on the streamer 22 while allowing the streamer 22 to pass there through. The roller assembly 40 may also position the nozzles 32 and 36 at a fixed distance from the streamer 22. The roller assembly 40 may comprise wheels 42, such as castors, rollers, or continuous tracks that grip the streamer 22 and apply a slight compression force on the streamer 22. In the illustrated embodiment, the roller assembly 40 comprises two sets of wheels 42. The roller assembly 40 may be configured to open while applying of the compression force to ensure that the streamer-preparation apparatus 4 both follows inconsistencies in streamer diameter and positions the nozzles 32 and 36 concentrically (or as concentrically as practical) around the streamer. The roller assembly 40 may be configured to open sufficiently to allow streamer attachments to pass through. In the illustrated embodiment, the cleaning-fluid nozzle unit 28 and the gaseous-fluid nozzle unit 30 are positioned on other side of the roller assembly 40.

Figure 3:
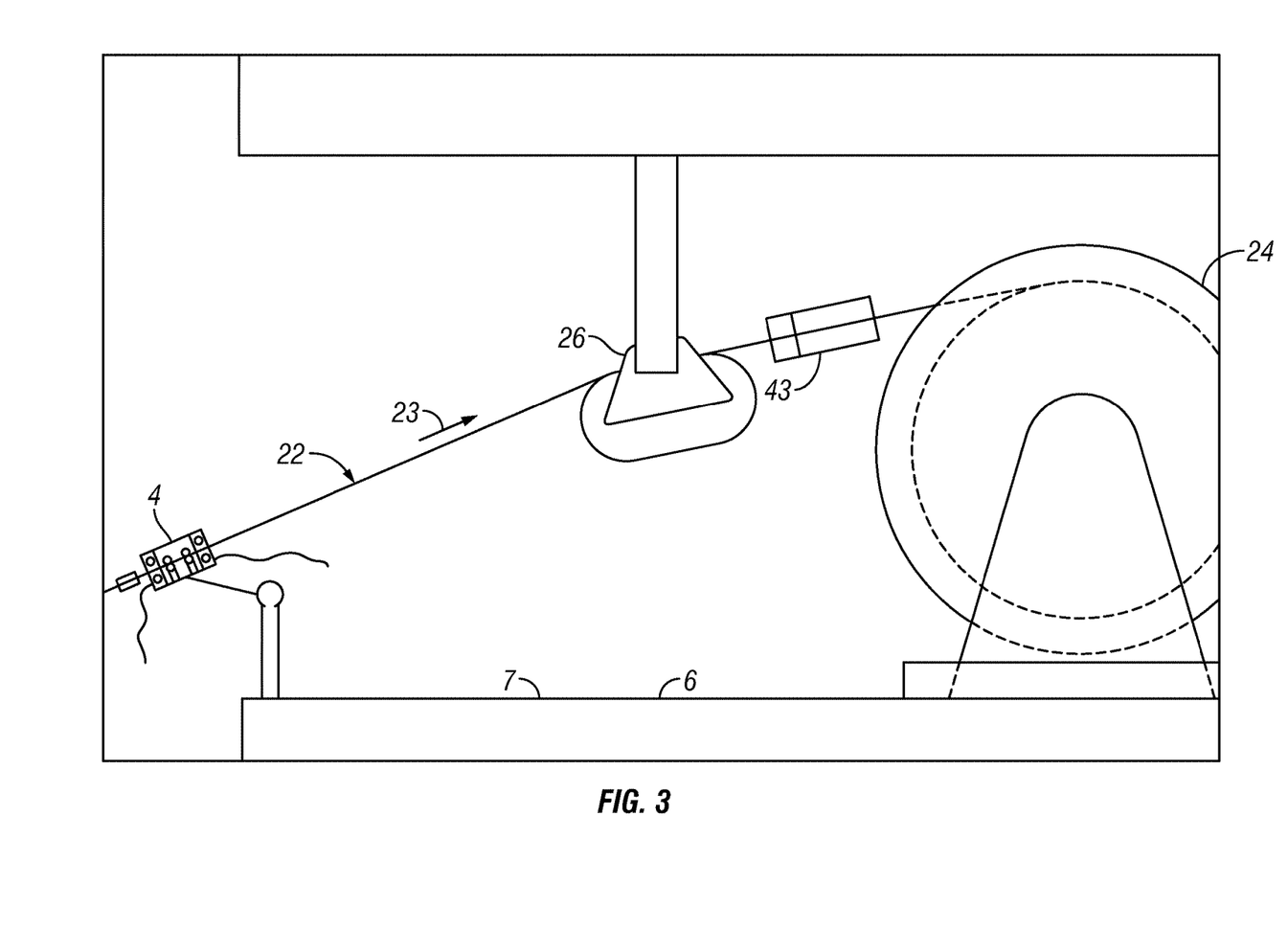
FIG. 3 illustrates an alternative embodiment that employs a streamer-preparation apparatus on streamer recovery.

Referring now to FIG. 3, an alternative embodiment is illustrated that employs the streamer-preparation apparatus 4 on recovery of the streamer 22. As illustrated, the streamer 22 may be retrieved onto the stern 7 of the survey vessel 6 and stored on drum 24, for example. As previously described, the streamer 22 may pass through the streamer-preparation apparatus 4 prior to storage on the drum 24. The streamer-preparation apparatus 4 may be similar in function and structure to that described above with respect to FIG. 2A. The streamer-preparation apparatus 4 may direct a cleaning fluid onto the surface of the streamer 22 to remove seawater and/or marine growth from the streamer 22. The streamer-preparation apparatus 4 may also direct a gaseous fluid onto the surface of the streamer 22 such that the surface of the streamer 22 may be dried. The gaseous fluid may blow off the mixture of the deposits (e.g., seawater, marine growth, etc.) and the cleaning fluid and dry the streamer 22.

However, in some embodiments, the streamer-preparation apparatus 4 may not remove all of the marine growth from the streamer. For example, a calcious pad of marine growth may be on the streamer 22 that may be difficult to remove with the streamer-preparation apparatus 4. Accordingly, FIG. 3 further includes a supplemental cleaning unit 43. As illustrated, the supplemental cleaning unit 43 may be located after the streamer-preparation apparatus 4 with respect to the direction of movement of the streamer 22. In the illustrated embodiment, the streamer 22 may move in the direction indicated by arrow 23. As illustrated, the supplemental cleaning unit 43 may be positioned on the opposite side of the spooling block 26 from the streamer-preparation apparatus 4 and positioned proximate the drum 24. While not illustrated, the supplemental cleaning unit 43 may alternatively be positioned on the same side of the spooling block 26 as the streamer-preparation apparatus 4. The supplemental cleaning unit 43 may be configured to apply a marine-growth cleaning fluid to the streamer 22. The marine-growth cleaning fluid may function, for example, to dissolve the marine growth from the streamer 22 while stored on the drum 24. Examples of suitable marine-growth cleaning fluids include commercially available products, such as Barnacle Buster™ marine growth remover, available from TRAC Ecological Green Products.

Figure 4:
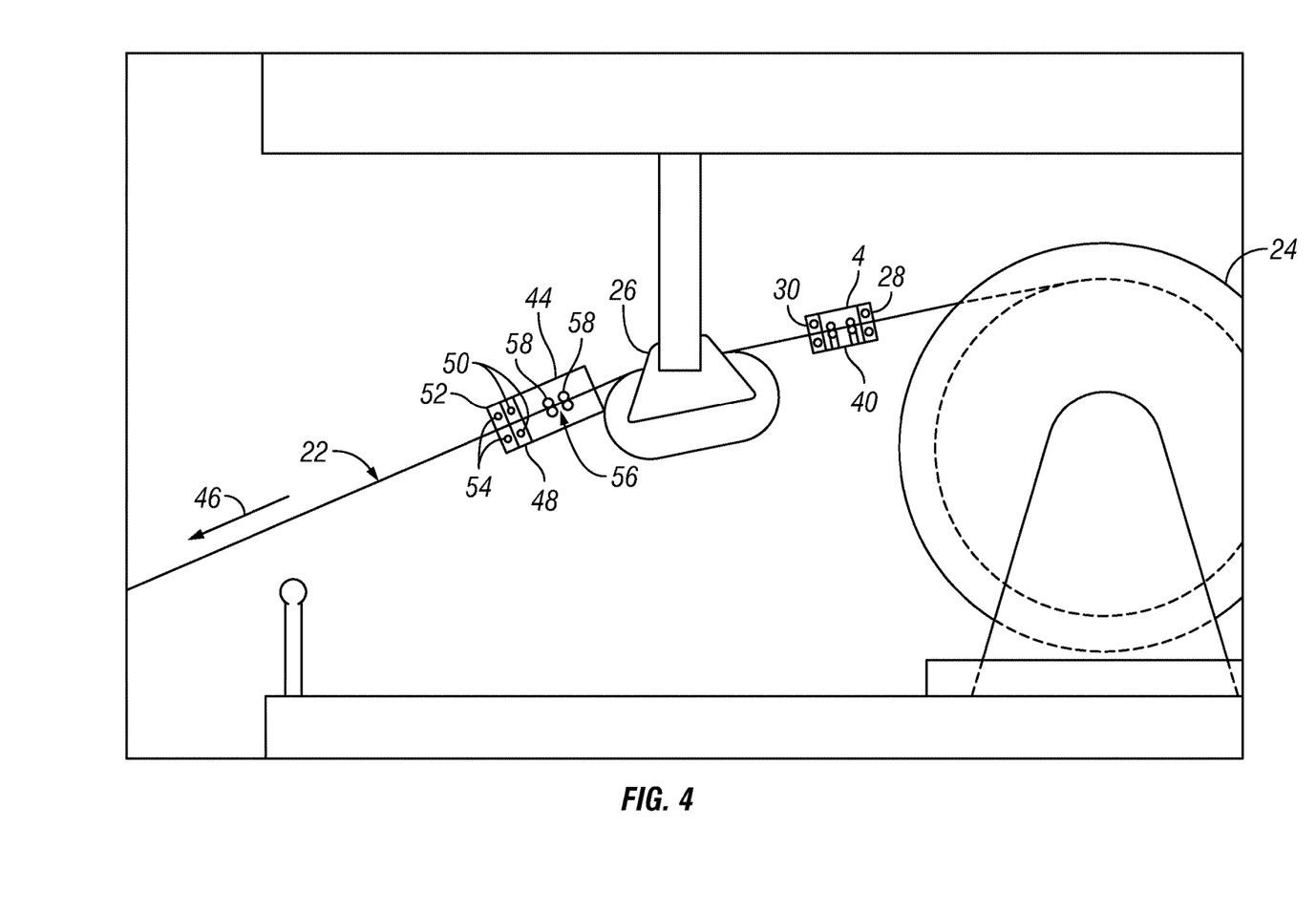
FIG. 4 illustrates an embodiment that employs a streamer-preparation apparatus on streamer deployment.

Referring now to FIG. 4, an alternative embodiment is illustrated that employs the streamer-preparation apparatus 4 in conjunction with a painting unit 44 on deployment of the streamer 22. Cleaning of the streamer 22 on deployment may be used in place of, or in addition to, cleaning on recovery, for example, as described above with respect to FIGS. 2A, 2B, and 3. In some embodiments, it may be desired to use the streamer-preparation apparatus 4 on recovery even where cleaning will also be employed on deployment to prevent drying of the seawater and marine growth on the streamer 22 while stored on the drum 24. As illustrated, the streamer 22 may be stored on the drum 24. The streamer 22 may be unwound from the drum 24 and deployed in the body of water 8 (e.g., see FIG. 1). The spooling block 26 may help facilitate removal of the streamer 22 from the drum 24. In the illustrated embodiment, the streamer 22 may move in the direction indicated by arrow 46 during deployment.

In the illustrated embodiment, the streamer 22 may pass through the streamer-preparation apparatus 4 prior to deployment in the water. The streamer-preparation apparatus 4 may be similar in function and structure to that described above with respect to FIG. 2A. In some embodiments, the streamer 22 may be cleaned on recovery as shown, for example, on FIGS. 2A, 2B, and 3, and also cleaned on deployment. As illustrated, the streamer-preparation apparatus 4 may comprise a cleaning-fluid nozzle unit 28, a gaseous-fluid nozzle unit 30, and a roller assembly 40. The streamer-preparation apparatus 4 may direct a cleaning fluid (e.g., air, fresh water, seawater) onto the surface of the streamer 22 to remove dried salt and/or marine growth from the streamer 22. In some embodiments, there may be sufficient fresh water available on deployment for its use the cleaning fluid in place of, or in addition to, seawater. The streamer-preparation apparatus 4 may also direct a gaseous fluid (e.g., air) onto the surface of the streamer 22 such that the surface of the streamer 22 may be dried.

FIG. 4 further illustrates use of a painting unit 44 configured to apply an antifouling paint to the streamer 22 in accordance with embodiments of the invention. The streamer 22 may pass through the painting unit 44 during deployment. The painting unit 44 may be deployed after the streamer-preparation apparatus 4 with respect to the direction of movement of the streamer 22. In the illustrated embodiment, the painting unit 44 is located on the opposite side of the spooling block 26 from the streamer-preparation apparatus 4. While not illustrated, the painting unit 44 may also be positioned on the same side of the spooling block 26 as the streamer-preparation apparatus 4.

The painting unit 44 may include a painting chamber 48, which may be an enclosed chamber, for example. The painting chamber 48 may include paint spray heads 50 positioned in the painting chamber 48 to apply the antifouling paint to the streamer 22 as it passes through the painting unit 44. In some embodiments, the painting unit 44 may be configured for air-assisted airless spraying, but other techniques may also be utilized, including air gun spraying and airless spray guns, for example. Any suitable antifouling paint may be used with the painting unit 44, including those previously described. In some embodiments, the antifouling paint may be used in combination with a curing agent such as water. For application of the curing agent, the painting unit 44 may further include a curing section 52, which may include curing-agent spray heads 54. The curing section 52 may be located after the painting chamber 48 with respect to the direction of movement of the streamer 22.

In some embodiments, the painting unit 44 may further comprise a device, such as roller assembly 56, for holding the painting unit 44 on the streamer 22 while allowing the streamer 22 to pass there through. The roller assembly 56 may also position the paint spray heads 50 and curing-agent spray heads 54 at a fixed distance from the streamer 22. The roller assembly 56 may comprise wheels 58, such as castors, rollers, or continuous tracks that grip the streamer 22 and apply a compression force on the streamer 22. In the illustrated embodiment, the roller assembly 56 comprises two sets of wheels 58. The roller assembly 56 may be configured to open while applying of the compression force to ensure that the painting unit 44 follows inconsistencies in streamer diameter. The roller assembly 56 may be configured to open sufficiently to allow the streamer 22, and streamer attachments such as collars for mounting depth controllers, to pass through. As illustrated, the painting chamber 48 and the curing section 52 may be positioned after the roller assembly 56 with respect to movement of the streamer 22, to minimize contact with the streamer 22 after paint application.

Figure 5:
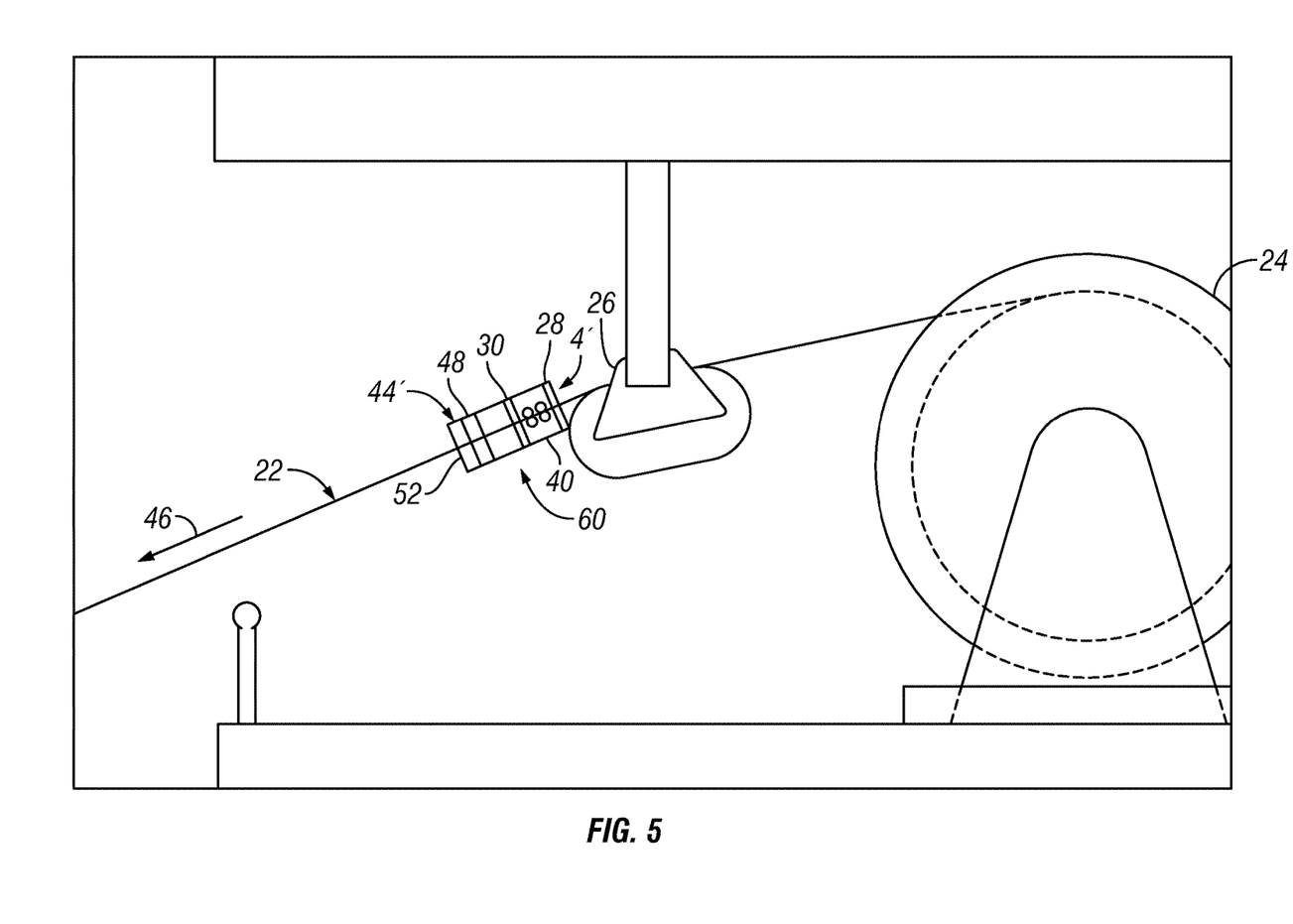
FIG. 5 illustrates an alternative embodiment that employs a streamer-preparation apparatus on streamer deployment.

Referring now to FIG. 5, an alternative embodiment is illustrated in which a painting unit 44' is incorporated into the streamer-preparation apparatus 4' for preparation and painting in the same apparatus on deployment of the streamer 22. As illustrated, the streamer 22 may be stored on the drum 24. The streamer 22 may be unwound from the drum 24 and deployed in the body of water 8 (e.g., see FIG. 1). The spooling block 26 may help facilitate removal of the streamer 22 from the drum 24. In the illustrated embodiment, the streamer 22 may move in the direction indicated by arrow 46 during deployment.

In the illustrated embodiment, the combined-preparation-and-painting unit 60 may include a streamer-preparation apparatus 4' and a painting unit 44'. The streamer 22 may pass through the streamer-cleaning apparatus 4' prior to deployment in the water. The combined-preparation-and-painting unit 60 may be similar in function and structure to that for the streamer-preparation apparatus 4 described above with respect to FIGS. 2A-4 except with incorporation of the painting unit 44'. As illustrated, the streamer-preparation apparatus 4' may comprise a cleaning-fluid nozzle unit 28, a gaseous-fluid nozzle unit 30, and a roller assembly 40. The streamer-preparation apparatus 4' may direct a cleaning fluid (e.g., air, fresh water, seawater) onto the surface of the streamer 22 to remove dried salt and/or marine growth from the streamer 22. The streamer-preparation apparatus 4' may also direct a gaseous fluid (e.g., air) onto the surface of the streamer 22 such that the surface of the streamer 22 may be dried. In some embodiments, the streamer 22 may be cleaned on recovery as shown, for example, on FIGS. 2A, 2B, and 3, and also cleaned on deployment.

As illustrated, the painting unit 44' may be incorporated into the combined-preparation-and-painting unit 60. In some embodiments, the painting unit 44' may be similar in function and structure to that described above with respect to FIG. 4 except without the roller assembly 56. In some embodiments, the painting unit 44' may comprise a painting chamber 48 and an optional curing section 52. As previously described, the painting chamber 48 may apply an antifouling paint to the streamer, and the curing section 52 may apply a curing agent, such as water, to the streamer 22. While the painting unit 44' is shown with the curing section 52, embodiments may use antifouling paints that do not require application of a curing agent so the curing section 52 may not be needed in all embodiments of the invention.

Referring now to FIG. 6A, an embodiment of a streamer-preparation apparatus 4" is illustrated in more detail. As illustrated, the streamer 22 may pass through the streamer-preparation apparatus 4" upon recovery and/or deployment in the direction indicated by arrow 68. The same or different streamer-preparation apparatus 4 may be used to clean the streamer 22 upon recovery and deployment.

In some embodiments, the streamer-preparation apparatus 4" may comprise a housing 62. The housing 62 may have a front end 64 and a rear end 66 with respect to direction of movement of the streamer 22. Whether on recovery or deployment, the streamer 22 may pass through the streamer-preparation apparatus 4" in the same direction with the streamer 22 entering the front end 64 and exiting the rear end 66. The front end 64 may comprise an inlet 70 through which the streamer 22 is received into the housing 62. The rear end 66 may comprise an outlet 72 through which the streamer 22 exits the housing 62.

In some embodiments, the streamer-preparation apparatus 4" may further comprise a cleaning-fluid nozzle unit 28, a gaseous-fluid nozzle unit 30, and a roller assembly 40. The function of these components of the streamer-preparation apparatus 4" is similar to that described with respect to FIGS. 2A-5. The gaseous-fluid nozzle unit 30 may be positioned after the cleaning-fluid nozzle unit 28 to blow off the cleaning fluid. In contrast to FIG. 2A in which the cleaning-fluid nozzle unit 28 is positioned proximate the front end 64 of the housing 62, the cleaning-fluid nozzle unit 28 of FIG. 6A may be positioned after the roller assembly 40. In operation, the streamer 22 may pass through the roller assembly 40, then pass through the cleaning-fluid nozzle unit 28 for cleaning, and then pass through the gaseous-fluid nozzle unit 30 for drying. It should be understood that embodiments of the invention may encompass alternative arrangements of the cleaning-fluid nozzle unit 28, gaseous-fluid nozzle unit 30, and roller assembly 40. By way of example, the cleaning-fluid nozzle unit 28 and/or gaseous-fluid nozzle unit 30 may be positioned on the other side of the roller assembly 40 than shown.

Figure 6B:
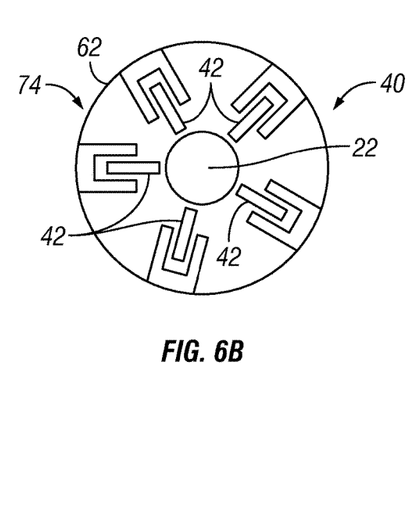
FIG. 6B illustrates a cross-sectional view of the streamer-preparation apparatus of FIG. 6A taken along line 6B-6B.

With additional reference to FIG. 6B, the roller assembly 40 may include rings 74 of wheels 42, such as castors, rollers, or continuous tracks. As best seen in FIG. 6, the roller assembly 40 may include a pair of the rings 74 spaced in the housing 62. The rings 74 of wheels 42 may be configured to hold the streamer-preparation apparatus 4" on the streamer 22 while allowing the streamer 22 to pass there through. The rings 74 of wheels 42 may also position the nozzles 32 and 36 at a fixed distance from the streamer 22.

Figure 6C:
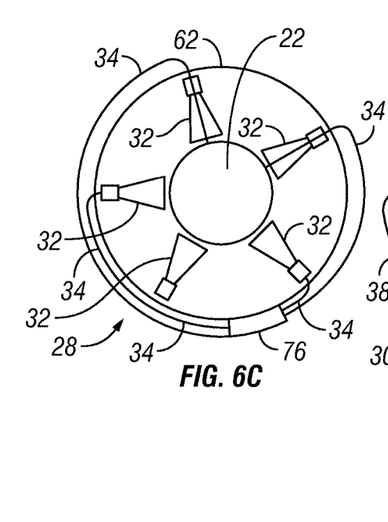
FIG. 6C illustrates a cross-sectional view of the streamer-preparation apparatus of FIG. 6A taken along line 6C-6C.
Figure 6D:
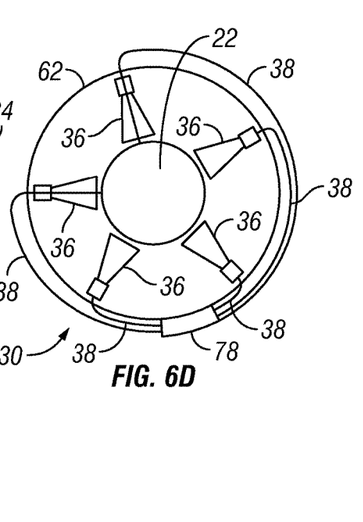
FIG. 6D illustrates a cross-sectional view of the streamer-preparation apparatus of FIG. 6A taken along line 6D-6D.

Turning now to FIGS. 6A and 6C, the cleaning-fluid nozzle unit 28 may include nozzles 32 arranged in the housing 62 in a ring-shaped configuration, or any suitable configuration that provides a selected distribution of cleaning fluid. In the illustrated embodiment, five of the nozzles 32 are contained in the cleaning-fluid nozzle unit 28, which may be evenly spaced in the ring-shaped configuration at a spacing of about 72°. The nozzles 32 may direct the cleaning fluid onto the streamer 22 as it passes through the cleaning-fluid nozzle unit 28. Fluid supply lines 34 are shown that supply the cleaning fluid to the cleaning-fluid nozzle unit 28. As illustrated, the fluid supply lines 34 may be coupled to a cleaning-fluid manifold 76 that receives cleaning fluid from onboard the survey vessel 6 (e.g., FIG. 2A).

Turning now to FIGS. 6A and 6C, the gaseous-fluid nozzle unit 30 may include nozzles 36 arranged in the housing 62 in a ring-shaped configuration, or any suitable configuration that provides a selected distribution of gaseous fluid. In the illustrated embodiment, five of the nozzles 36 are contained in the gaseous-fluid nozzle unit 30, which may be evenly spaced in the ring-shaped configuration at a spacing of 72°. The nozzles 36 may direct the gaseous fluid onto the streamer 22 as it passes through the gaseous-fluid nozzle unit 30. Gas supply lines 38 are shown that supply the cleaning fluid to the gaseous-fluid nozzle unit 30. As illustrated, the gas supply lines 38 may be coupled to a gas manifold 78 that receives the gaseous fluid from onboard the survey vessel 6 (e.g., FIG. 2A).

Accordingly, embodiments of the invention disclose that may be used to prepare a streamer 22 for application of antifouling paint. In some embodiments, the streamer-preparation apparatus 4, 4', or 4" may apply a cleaning fluid to remove saltwater and/or marine growth from the streamer 22 followed by a gaseous fluid to dry the streamer 22. The streamer-preparation apparatus 4, 4', or 4" may be used on recovery and/or deployment of the streamer 22.

Embodiments of the invention may further include application of an antifouling paint to the streamer 22 subsequent to preparation with the streamer-preparation apparatus 4, 4', or 4". The antifouling paint may reduce marine growth on the streamer 22 when used in the body of water 8, which can result in several advantages. By way of example, the reduction of marine growth may reduce drag on the streamer 22, allowing towing through the body of water 8 (e.g., FIG. 1) with a higher energy efficiency. With a reduced drag, fuel costs may be reduced for the same survey configuration or a greater towing capacity may be utilized at the same fuel costs. Moreover, reduction in marine growth on the streamer 22 may also reduce eddy formations resulting in a reduction in noise from the turbulent flow.

Figure 7:
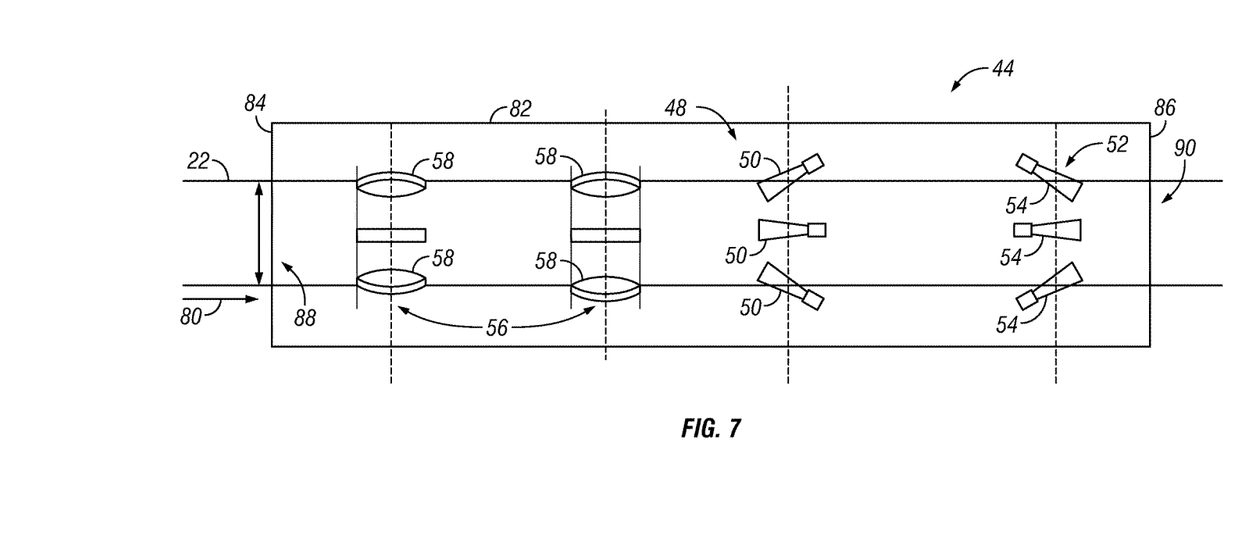
FIG. 7 illustrates an embodiment of a painting unit.

Referring now to FIG. 7, an embodiment of a painting unit 44 is illustrated that may be used for application of an antifouling paint to the streamer 22 on deployment. As illustrated, the streamer 22 may pass through the painting unit 44 upon deployment in the direction indicated by arrow 80. In some embodiments, the painting unit 44 may comprise a painting unit housing 82. The painting unit housing 82 may have a front end 84 and a rear end 86 with respect to direction of movement of the streamer 22. The front end 84 may comprise a painting unit inlet 88 through which the streamer 22 is received into the painting unit housing 82. The rear end 86 may comprise a painting unit outlet 90 through which the streamer 22 exits the painting unit housing 82.

As illustrated, the painting unit 44 may include a painting chamber 48, which may be an enclosed chamber, for example. The painting chamber 48 may include paint spray heads 50 positioned in the painting chamber 48 to apply the antifouling paint to the streamer 22. The paint spray heads 50 may be positioned in the painting chamber 48 in a ring-shaped configuration, or any suitable configuration that provides a selected distribution of antifouling paint. As previously described, the antifouling paint may be used in combination with a curing agent, such as water. In the illustrated embodiment, the painting unit 44 may further include a curing section 52 positioned in the painting unit housing 82 after the painting chamber 48. As illustrated, the curing section 52 may include spray heads 54 configured for application of a curing agent, such as water, onto the streamer 22. The spray heads 54 may be positioned in the curing section 52 in a ring-shaped configuration, or any suitable configuration that provides a selected distribution of curing agent.

With continued reference to FIG. 7, the painting unit 44 may further include a roller assembly 56 configured to hold the painting unit 44 on the streamer 22 while allowing the streamer 22 to pass there through. As illustrated, the roller assembly 56 may comprise wheels 58, such as castors, rollers, or continuous tracks. In the illustrated embodiment, the roller assembly 56 comprises two sets of the wheels 58, wherein each set of the wheels 58 may be positioned in the painting unit housing 82 in a ring-shaped configuration. To minimize contact with the streamer 22 after paint application, the painting chamber 48 and curing section 52 may be positioned in the painting unit housing 82 after the roller assembly 56

Although specific embodiments have been described above, these embodiments are not intended to limit the scope of the present disclosure, even where only a single embodiment is described with respect to a particular feature. Examples of features provided in the disclosure are intended to be illustrative rather than restrictive unless states otherwise. The above description is intended to cover such alternatives, modifications, and equivalents as would be apparent to a person skilled in the art having the benefit of this disclosure.

The scope of the present disclosure includes any feature of combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A method comprising:
    moving a streamer into position for preparation for cleaning either while the streamer is retrieved for storage on a drum on a survey vessel or while the streamer is being unwound from the drum on the survey vessel;
    directing a cleaning fluid onto the streamer as the streamer is being moved through a cleaning-fluid nozzle unit; and
    directing a gaseous fluid onto the streamer as the streamer is being moved through a gaseous-fluid nozzle unit.

2. The method of claim 1 wherein the step of moving the streamer occurs while the streamer is being recovered onto the survey vessel from a body of water.

3. The method of claim 2, further comprising applying a marine-growth cleaning fluid for dissolving marine growth on the streamer after the cleaning fluid and the gaseous fluid.

4. The method of claim 1 wherein the step of moving the streamer occurs while the streamer is being deployed into a body of water from the survey vessel.

5. The method of claim 4 further comprising applying an antifouling paint to the streamer as the streamer is being deployed from the survey vessel.

6. The method of claim 5 further comprising applying a curing agent to the streamer as the streamer is being deployed from the survey vessel.

7. The method of claim 6 wherein the antifouling paint comprises at least one copper biocide selected from the group consisting of copper, a copper alloy, a copper oxide, or a copper salt, and wherein the curing agent comprises water.

8. The method of claim 1 wherein the cleaning fluid comprises at least one fluid selected from the group consisting of air and water, and wherein the gaseous fluid comprises air.

9. The method of claim 1 wherein the step of moving the streamer comprises passing the streamer through a streamer-preparation apparatus, wherein the streamer-preparation apparatus comprises the cleaning-fluid nozzle unit for directing the cleaning fluid onto the streamer and the gaseous-fluid nozzle unit for directing the gaseous fluid onto the streamer.

10. The method of claim 9 wherein the streamer-preparation apparatus further comprises a roller assembly positioned to apply pressure to the streamer as it passes through the streamer-preparation apparatus.

11. The method of claim 10, wherein the roller assembly comprises wheels, the method further comprising applying pressure to the streamer with the wheels as the streamer passes through the streamer-preparation apparatus.

12. The method of claim 10, wherein the roller assembly comprises two rings of wheels that are arranged around the streamer.

13. The method of claim 10, wherein the roller assembly comprises continuous tracks, the method further comprising applying pressure to the streamer with the continuous tracks as the streamer passes through the streamer-preparation apparatus.

14. The method of claim 9, wherein a tether member or telescoping arm secures the streamer-preparation apparatus to a stern of the survey vessel.

15. The method of claim 9, wherein the streamer-preparation apparatus is secured to a spooling block on a stern of the survey vessel.

16. The method of claim 9, wherein the cleaning-fluid nozzle unit is positioned on a front side of the streamer-preparation apparatus with respect to passage of the streamer through the streamer-preparation apparatus such that the streamer is cleaned with the cleaning fluid prior to application of the gaseous fluid.

17. The method of claim 16, wherein the cleaning-fluid nozzle unit comprises nozzles arranged around the streamer in a ring configuration as the streamer passes through the streamer-preparation apparatus, and wherein the gaseous-fluid nozzle unit comprises additional nozzles arranged around the streamer in a ring configuration as the streamer passes through the streamer-preparation apparatus.

18. The method of claim 9, wherein the streamer-preparation apparatus comprises a housing comprising an inlet through which the streamer is received and an outlet through which the streamer exits the housing.

19. The method of claim 1 wherein the streamer comprises at least one streamer selected from the group consisting of a towed marine streamer and an ocean bottom cable.

20. The method of claim 19 wherein the marine streamer comprises seismic sensors, electromagnetic sensors, or any combination thereof.

21. The method of claim 1, wherein the cleaning fluid comprises water, the method further comprising heating the water.

22. The method of claim 1, wherein the cleaning fluid comprises seawater.

* * * * *